United States Patent [19]
Loblick

[11] Patent Number: 6,142,009
[45] Date of Patent: Nov. 7, 2000

[54] SMOKE GENERATING APPARATUS

[75] Inventor: Norton Marcus Loblick, Edmonton, Canada

[73] Assignee: Graminia Development Ltd., Edmonton, Canada

[21] Appl. No.: 09/124,455

[22] Filed: Jul. 28, 1998

[30] Foreign Application Priority Data

May 22, 1998 [CA] Canada ................................. 2238301

[51] Int. Cl.[7] .............................. G01M 3/20; H05B 1/00
[52] U.S. Cl. ........................ 73/40.7; 392/397; 392/403; 239/136
[58] Field of Search ........................... 73/40.7, 47, 49.7; 252/305; 43/127, 128; 392/397, 403, 402, 394; 239/136, 339, 372, 590.5

[56] References Cited

U.S. PATENT DOCUMENTS

| | | | |
|---|---|---|---|
| 3,250,723 | 5/1966 | Fortney | 73/40.7 |
| 4,349,723 | 9/1982 | Swiatosz | 219/271 |
| 5,107,698 | 4/1992 | Gilliam | 73/40 |
| 5,322,564 | 6/1994 | Ludwig et al. | 239/490.5 |
| 5,922,944 | 7/1999 | Pieroni et al. | 73/40.7 |

*Primary Examiner*—Daniel S. Larkin
*Attorney, Agent, or Firm*—Christensen O'Connor Johnson & Kindness PLLC

[57] ABSTRACT

A smoke generating apparatus includes a housing having an interior cavity. A heated substrate is disposed within the interior cavity of the housing. A reservoir is provided to hold smoke generating liquid. An atomizing nozzle is disposed within the interior cavity of the housing. The nozzle has an inlet end and an outlet end. The outlet end points toward the heated substrate, such that fluid medium discharged through the outlet of the nozzle strikes the heated substrate. The inlet end of the nozzle is coupled to a source of gas under pressure. A liquid flow passage is provided which connects the nozzle with the reservoir. A flow of gaseous medium through the nozzle atomizes smoke generating liquid drawn from the reservoir.

13 Claims, 3 Drawing Sheets

SMOKE GENERATING APPARATUS

FIELD OF THE INVENTION

The present invention relates to a smoke generating apparatus.

BACKGROUND OF THE INVENTION

U.S. Pat. No. 5,107,698 which issued to Gilliam in 1992 discloses a smoke generating apparatus. Smoke generating apparatus, such as those disclosed by Gilliam, are used to test for hairline cracks and similar leaks that are not detectable by visual inspection. The location of the leak is detected by observing smoke exiting from the leak. The Gilliam apparatus has a container in which is disposed a heating element. The container is filled with a smoke producing liquid until the liquid level reaches, without submerging, the heating element. An air pump forces a flow of air to bubble up through the smoke producing liquid, propelling a geyser of the smoke producing liquid into contact with the heating element. A portion of the smoke producing liquid coming in contact with the heating element is vaporized. When the smoke producing liquid is vaporized, it becomes smoke. As the flow of air exits the container it carries the smoke. The flow of air can be directed as required for testing purposes.

The bubbling up of air through the smoke producing liquid, as taught by Gilliam has a number of disadvantages. There have been recorded incidents of explosions occurring when the geyser of liquid served to complete a circuit through which electricity could flow.

SUMMARY OF THE INVENTION

What is required is an alternative configuration of smoke generating apparatus that will reduce or eliminate the possibility of explosion.

According to the present invention there is provided a smoke generating apparatus which includes a housing having an interior cavity. A heated substrate is disposed within the interior cavity of the housing. A reservoir is provided to hold smoke generating liquid. An atomizing nozzle is disposed within the interior cavity of the housing. The nozzle has an inlet end and an outlet end. The outlet end points toward the heated substrate, such that fluid medium discharged through the outlet of the nozzle strikes the heated substrate. Means is provided to couple the inlet end of the nozzle to a source of gas under pressure. A liquid flow passage is provided which connects the nozzle with the reservoir. A flow of gaseous medium through the nozzle serves to atomize the smoke generating liquid.

The smoke generating apparatus, as described above, deposits a fine mist-like spray of smoke generating liquid onto a heated substrated, such as a conductive coil. The risk of an electrical connection being made by a geyser of smoke generating liquid is eliminated. Where a lower portion of the housing serves as the liquid reservoir, the nozzle can be positioned within the liquid reservoir with the nozzle partially submerged in the smoke generating liquid. The reservoir can also be positioned in a separate liquid retaining portion of the housing or completely outside of the housing. As a further safety feature it is preferred that the conductive coil be insulated from the housing.

Although beneficial results have been obtained through the use of the smoke generating apparatus, as described above, improved smoke generation have been obtained when two additional features are provided. When the conductive coil coils around a central axis and the outlet end of the spray nozzle is positioned along the axis, improved vapourization of the smoke generating liquid has been obtained. When means are provided to adjust the relative spacing between the outlet end of the spray nozzle and the conductive coil, the vapourization of the smoke generating liquid can be further improved.

There are different ways to construct a nozzle so that the passage of gaseous medium through the nozzle will draw smoke generating liquid from the reservoir. What is required is a pressure drop at the nozzle outlet that will serve to draw liquid from the reservoir. This can be achieved by placing a restriction at an outlet end of a liquid flow passage extending through the nozzle. The flow of gaseous medium through the nozzle effects the efficiency of the nozzle in drawing liquid. Beneficial results have been obtained by providing within the nozzle a gaseous medium flow passage. The gaseous medium flow passage has an inlet portion and an outlet portion. The outlet portion of the gaseous medium flow passage divides into at least two branch passages. The lifting force of the gaseous medium is best when the sum of the cross-sectional areas of the outlet portions is substantially equal to the cross-sectional area of the inlet portion. It is undesirable for any vortex to be caused in the nozzle outlet. It is, therefore, preferred that the branch passages be positioned adjacent the outlet end of the liquid flow passage and that means be provided to deflect the flow of gaseous medium from the branch passages of the gaseous medium flow passage to provide a substantially linear flow through the outlet end of the nozzle.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
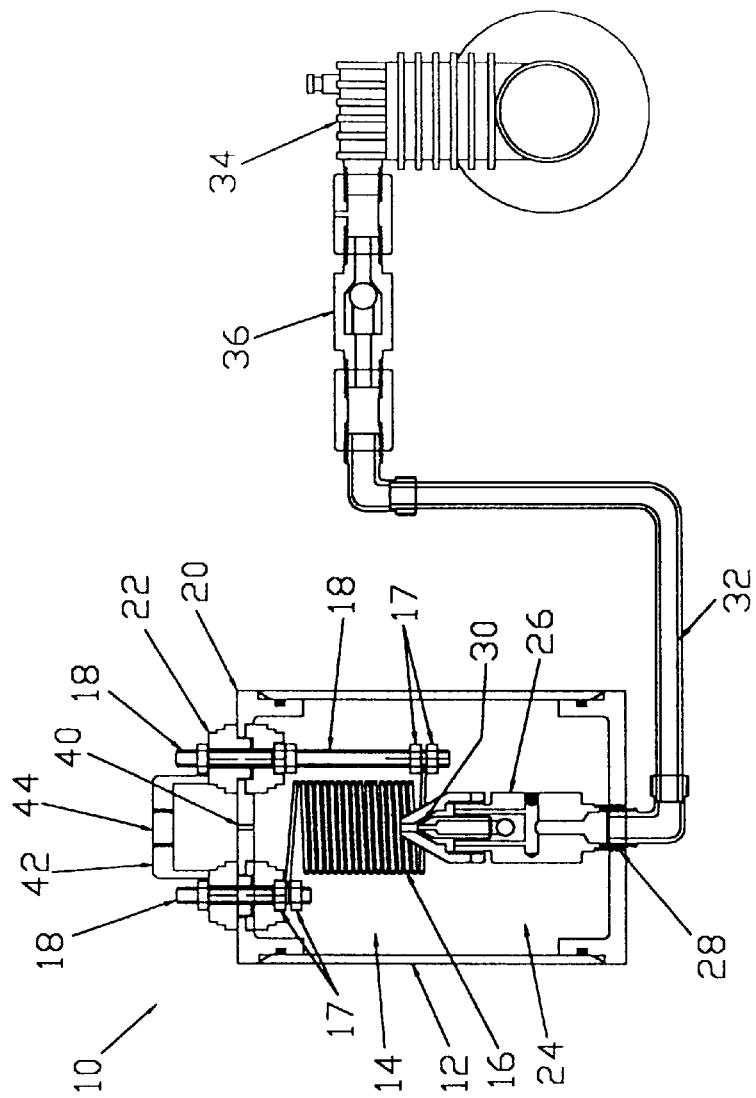
FIG. 1 is a front elevation view of a smoke generating apparatus constructed in accordance with the teachings of the present invention.

The preferred embodiment, a smoke generating apparatus generally identified by reference numeral 10, will now be described with reference to FIGS. 1 through 5.

Figure 2:
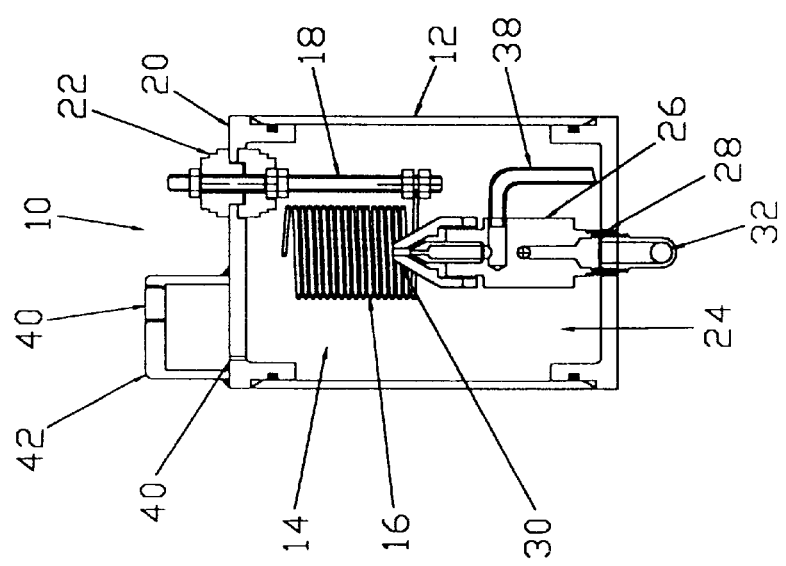
FIG. 2 is a side elevation view of the smoke generating apparatus illustrated in FIG. 1.

Referring to FIG. 1, smoke generating apparatus 10 includes a housing 12 having an interior cavity 14. A heated substrate, such as conductive coil 16 is secured by nuts 17 to mounting posts 18 which extend down from a top 20 of housing 12. This manner of mounting positioned conductive coil 16 so that it extends down into interior cavity 14. When working with 120 volt or 240 volt power sources, it is preferred that conductive coil 16 have an insulated coating. With battery operated units having lower operating voltages an insulated coating of conductive coil 16 is not viewed as being as critical. Insulators 22 are positioned between mounting posts 18 and housing 12 to insulate conductive coil 16 from housing 12. That portion of interior cavity 14 of housing 12 that is positioned below conductive coil 16 serves as a reservoir, generally indicated by reference numeral 24, to hold smoke generating liquid. An atomizing nozzle 26 is disposed within interior cavity 14 of housing 12. Nozzle 26 has an inlet end 28 and an outlet end 30. Outlet end 30 points toward conductive coil 16, such that fluid medium discharged through outlet end 30 of nozzle 26 strikes conductive coil 16. A conduit 32 connects inlet end 28 of nozzle 26 to a compressor 34 which serves as a source of supplying gas under pressure to nozzle 26. A one way check valve 36 is provided on conduit 32 to ensure that the flow can only go from compressor 34 into nozzle 26, but not in the reverse direction from nozzle 26 but to compressor 34. Referring to FIG. 2, a liquid flow passage in the form of a tube 38 is provided which connects nozzle 26 with reservoir 24. A flow of gaseous medium from compressor 34 through nozzle 26 draws smoke generating liquid (not shown) from reservoir 24 through tube 38. The smoke generating liquid is atomized delivered as a fine mist-like spray onto conductive coil 16. Conductive coil 16 is maintained at a temperature that causes the smoke generating liquid to immediately vapourize upon contact to form smoke. Smoke exits interior cavity 14 through a smoke outlet 40 in top 20 of housing 12. A liquid knockout chamber 42 is disposed on top 20 of housing 12 over smoke outlet 40. Liquid knockout chamber 42 has an outlet 44 which is offset from smoke outlet 40. This forces smoke to follow a circuitous path from smoke outlet 40 to liquid knockout outlet 44, which provides an opportunity for entrained liquid to be released from the smoke. Liquid knockout outlet 44 would normally have a hose connection (not shown) to permit hoses to be attached to direct the smoke to an intended application.

Figure 3:
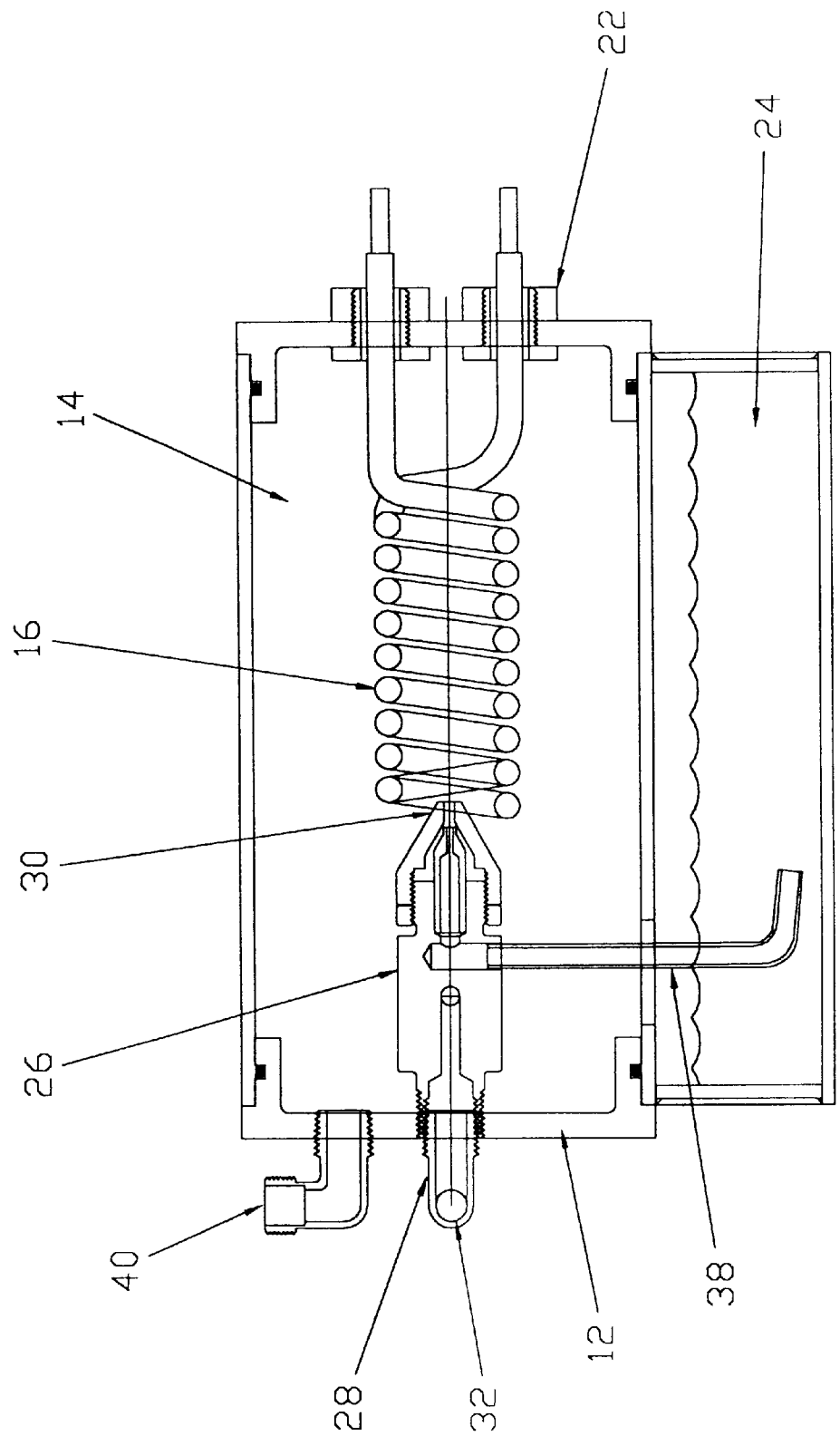
FIG. 3 is a side elevation view of an alternative embodiment of smoke generating apparatus constructed in accordance with the teachings of the present invention.

Referring to FIG. 3, there is illustrated an alternative embodiment in which reservoir 24 is separate and the orientation of nozzle 26 is substantially horizontal instead of substantially vertical. This alternative embodiment is intended to illustrated that neither the orientation of nozzle 26, nor the positioning of reservoir 24 is critical to the operation of the smoke generating apparatus.

Figure 5:
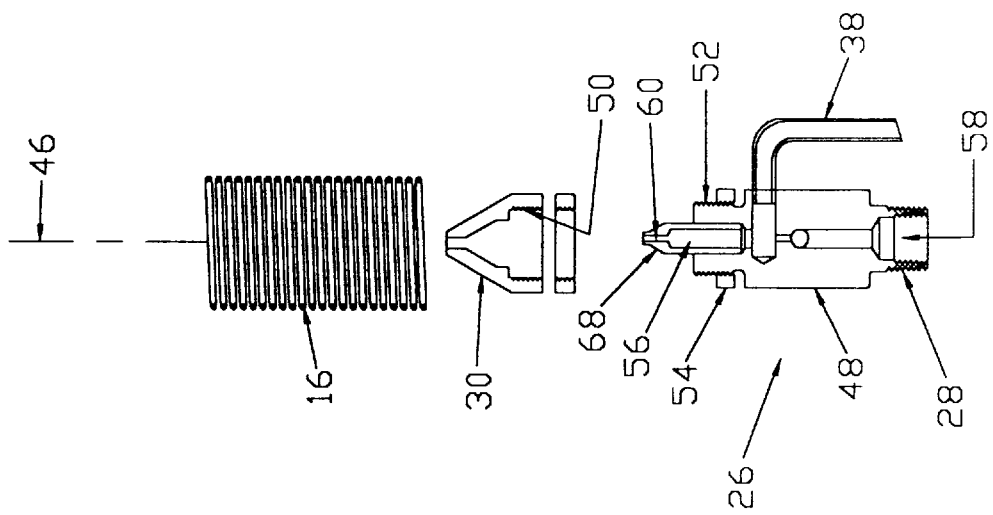
FIG. 5 is an exploded side elevation view of a nozzle portion of the smoke generating apparatus illustrated in FIG. 1.
Figure 4:
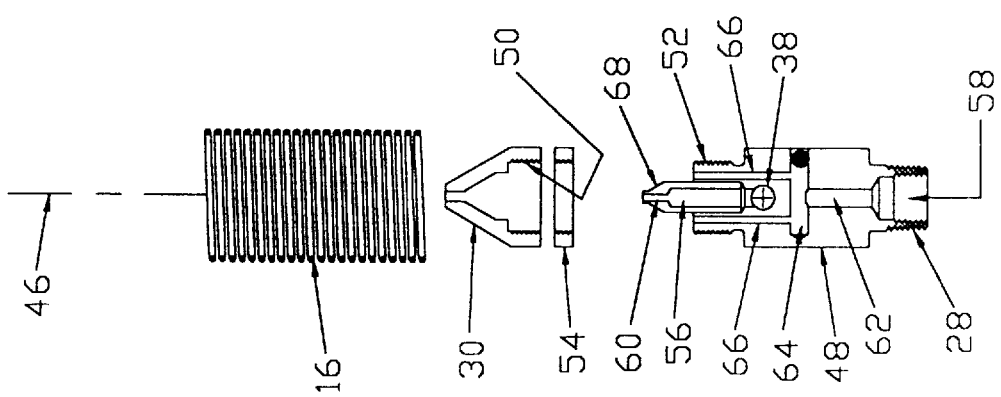
FIG. 4 is an exploded front elevation view of a nozzle portion of the smoke generating apparatus illustrated in FIG. 1.

Referring to FIGS. 4 and 5, the construction and operation of nozzle 26 will now be described in detail. Conductive coil 16 coils around a central axis, generally indicated by reference numeral 46. Outlet end 30 of nozzle 26 is positioned to discharge substantially along central axis 46, so that outlet end 30 of nozzle 26 and, in particular, the spray therefrom is surrounded by conductive coil 16. Body 48 of nozzle 26 has both a liquid flow passage 56 and a gaseous medium flow passage 58. Liquid flow passage 56 terminates in a restricted bore 60. Restricted bore 60 causes a pressure drop as liquid exits liquid flow passage 56 to enter outlet end 30. Referring to FIG. 4, gaseous medium flow passage 58 has an inlet portion 62 and an outlet portion 64. The outlet portion of the gaseous medium flow passage divides into two branch passages 66. The lifting force of the gaseous medium is best when the sum of the cross-sectional areas of branch passages 66 of outlet portion 64 is substantially equal to the cross-sectional area of inlet portion 62. Branch passages 66 are positioned on either side of restricted bore 60 of liquid flow passage 56. As gaseous medium exits branch passages 66 and flows into outlet end 30, the gaseous medium tends to converge with a stream of smoke generating liquid passing through restricted bore 60. It is undesirable for any vortex to be caused at outlet end 30 of nozzle 26. A guide surface 68 is, therefore, built into the terminus of liquid flow passage 56 to deflect the converging flow of gaseous medium from branch passages 66 to be substantially linear to the smoke generating liquid passing through restricted bore 60 of liquid flow passage 56. Outlet end 30 of nozzle 26 is a separate component from body 48 of nozzle 26. Outlet end 30 has internal threads 50 by means of which outlet end 30 is secured to external threads 52 on body 48. The threaded attachment of outlet end 30 to body 48 serves as means to adjust the relative spacing between outlet end 30 of nozzle 26 and guide surface 68. As outlet end 30 is moved along external threads 52 away from body 48 the space between outlet end 30 and guide surface 68 conductive coil 16 is enlarged. As outlet end 30 is moved along external threads 52 toward body 48 the space between outlet end 30 and guide surface 68 is restricted. This permits the flow of air relative to the volume of smoke generating liquid to be adjusted. This adjustment enables apparatus 10 to be used with smoke generating liquids having differing viscosity. In the absence of such an adjustment apparatus 10 would only be capable of being used with smoke generating liquid of one viscosity. The greater the viscosity of the smoke generating liquid, the greater the air flow required to atomize the liquid. Conversely, as viscosity is decreased, the less air flow required to atomize the liquid. A threaded lock ring 54 threads onto external threads 52 of body 48 and serves to maintain the positioning of outlet end 30, so that the selected spacing is not inadvertently altered.

It will be apparent to one skilled in the art that there are alternative ways of configuring the atomizing nozzle. The preferred atomizing nozzle is comparatively simple, and uses the flow of gaseous medium to draw the required smoke generating liquid that is atomized. A more complex atomizing nozzle could be constructed with the smoke generating liquid being hydraulically injected into the flow of gaseous medium. It will also be apparent to one skilled in the art that other modifications may be made to the illustrated embodiment without departing from the spirit and scope of the invention as hereinafter defined in the Claims.

What is claimed is:

1. A smoke generating apparatus, comprising:
    a housing having an interior cavity;
    a heated substrate is disposed within the interior cavity of the housing;
    a reservoir;
    an atomizing nozzle disposed within the interior cavity of the housing, the nozzle having an inlet end and an outlet end, with the outlet end pointing toward the heated substrate, the heated substrate surrounding the outlet end of the spray nozzle, such that fluid medium discharged through the outlet of the nozzle strikes the heated substrate;
    means to couple the inlet end of the nozzle to a source of gas under pressure; and
    a liquid flow passage connecting the nozzle with the reservoir, such that a flow of gaseous medium through the nozzle atomizes smoke generating liquid drawn from the reservoir via the liquid flow passage.

2. The smoke generating apparatus as defined in claim 1, wherein the heated substrate is a conductive coil.

3. The smoke generating apparatus as defined in claim 1, wherein the heated substrate is insulated from the housing.

4. The smoke generating apparatus as defined in claim 1, wherein a lower portion of the housing serves as the liquid reservoir and the nozzle is positioned within the liquid reservoir, such that the nozzle is partially submerged when the reservoir is filled with smoke generating liquid.

5. The smoke generating apparatus as defined in claim 1, wherein the reservoir is positioned outside of the housing.

6. The smoke generating apparatus as defined in claim 1, wherein means is provided to adjust the relative spacing between the outlet end of the spray nozzle and the heated substrate.

7. The smoke generating apparatus as defined in claim 1, wherein a gaseous medium flow passage is provided through the nozzle, the flow passage having an inlet portion and an outlet portion, the outlet portion of the gaseous medium flow passage being divided into at least two branch passages, the sum of the cross-sectional areas of the outlet portions being equal to the cross-sectional area of the inlet portion.

8. The smoke generating passage as defined in claim 1, wherein branch passages are positioned adjacent an outlet end of the liquid flow passage and means are provided to deflect the flow of gaseous medium from the branch passages of the gaseous medium flow passage to provide a substantially linear flow through the outlet end of the nozzle.

9. A smoke generating apparatus, comprising:

a housing having an interior cavity;

a heated substrate is disposed within the interior cavity of the housing;

a reservoir;

an atomizing nozzle disposed within the interior cavity of the housing, the nozzle having an inlet end and an outlet end, with the outlet end pointing toward the heated substrate, the heated substrate surrounding the outlet end of the spray nozzle, such that fluid medium discharged through the outlet of the nozzle strikes the heated substrate;

means to couple the inlet end of the nozzle to a source of gas under pressure; and a liquid flow passage connecting the nozzle with the reservoir, such that a flow of gaseous medium through the nozzle atomizes smoke generating liquid drawn from the reservoir via the liquid flow passage;

a gaseous medium flow passage being provided through the nozzle, the flow passage having an inlet portion and an outlet portion, the outlet portion of the gaseous medium flow passage being divided into at least two branch passages, the sum of the cross-sectional areas of the outlet portions being equal to the cross-sectional area of the inlet portion, the branch passages being positioned adjacent an outlet end of the liquid flow passage and means being provided to deflect the flow of gaseous medium from the branch passages of the gaseous medium flow passage to provide a substantially linear flow through the outlet end of the nozzle; and means being provided to adjust the relative spacing between the outlet end of the spray nozzle and the heated substrate.

10. The smoke generating apparatus as defined in claim 9, wherein the heated substrate is a conductive coil.

11. The smoke generating apparatus as defined in claim 9, wherein the heated substrate is insulated from the housing.

12. The smoke generating apparatus as defined in claim 9, wherein a lower portion of the housing serves as the liquid reservoir and the nozzle is positioned within the liquid reservoir, such that the nozzle is partially submerged when the reservoir is filled with smoke generating liquid.

13. The smoke generating apparatus as defined in claim 9, wherein the reservoir is positioned outside of the housing.

* * * * *